July 23, 1935. O. D. KENNEDY ET AL 2,009,087
FRAME AERIAL FOR WIRELESS RECEPTION
Filed April 4, 1933 4 Sheets-Sheet 1
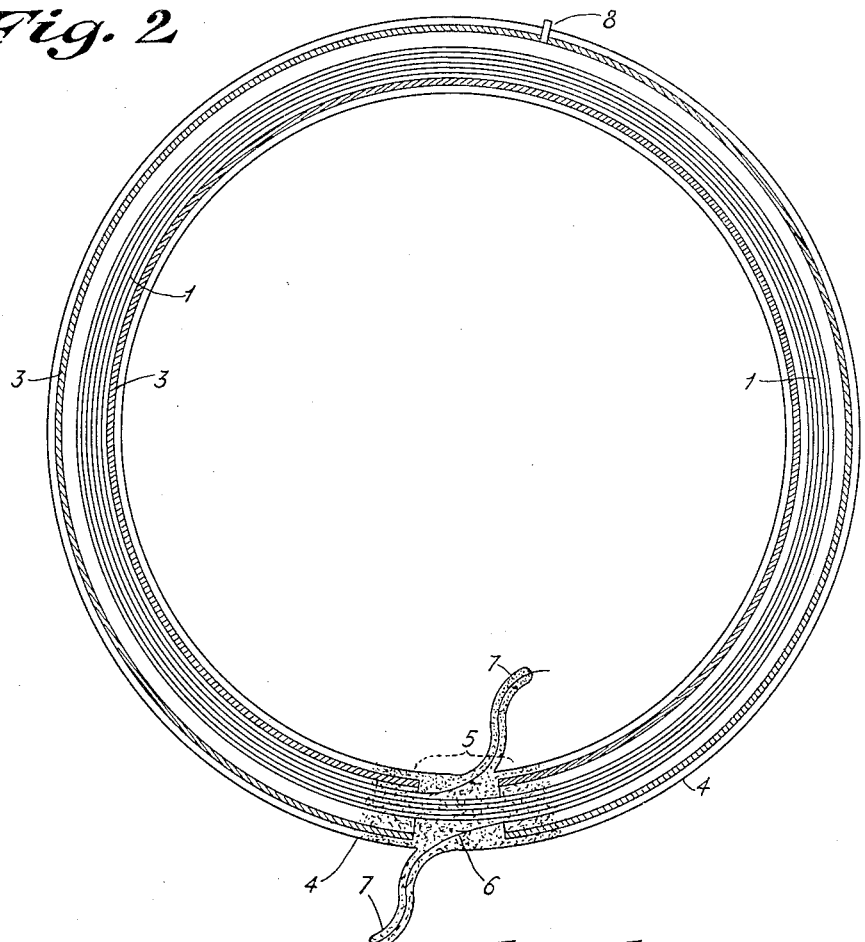
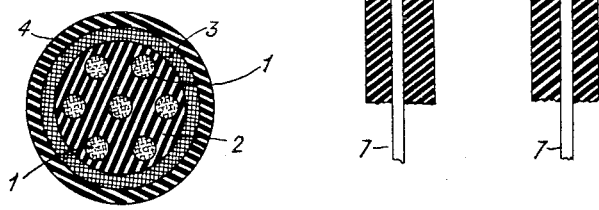
INVENTORS
OSCAR DOUGLAS KENNEDY
REGINALD HENRY MEAD
BY
ATTORNEY July 23, 1935.  O. D. KENNEDY ET AL  2,009,087
FRAME AERIAL FOR WIRELESS RECEPTION
Filed April 4, 1933    4 Sheets-Sheet 2
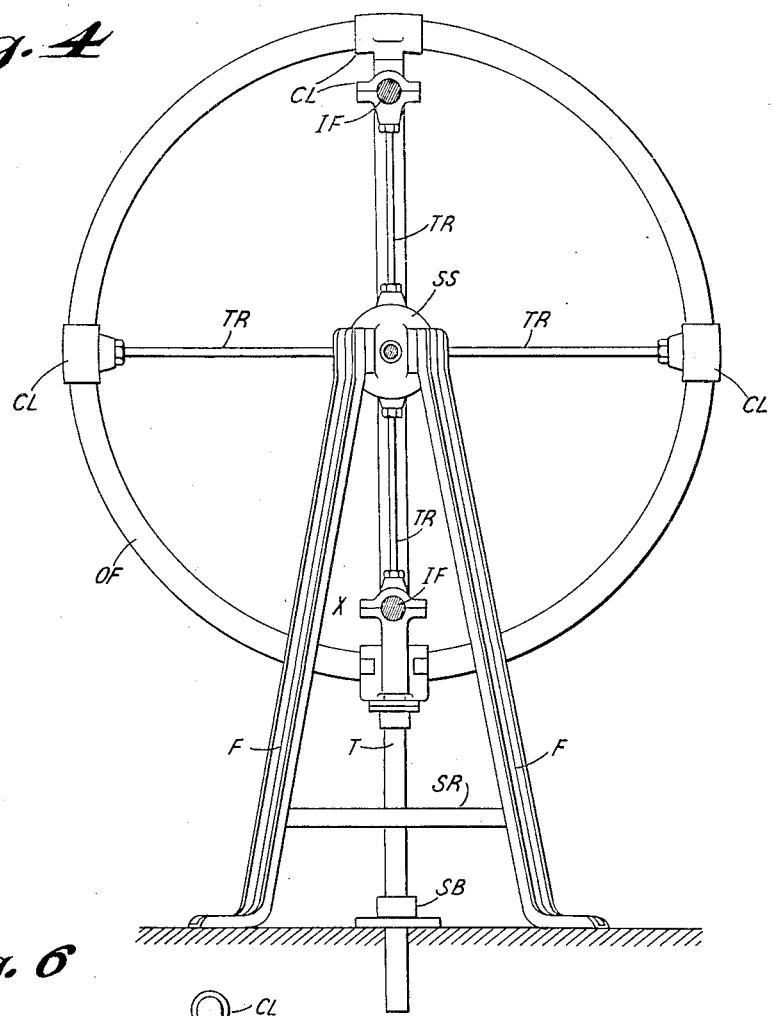
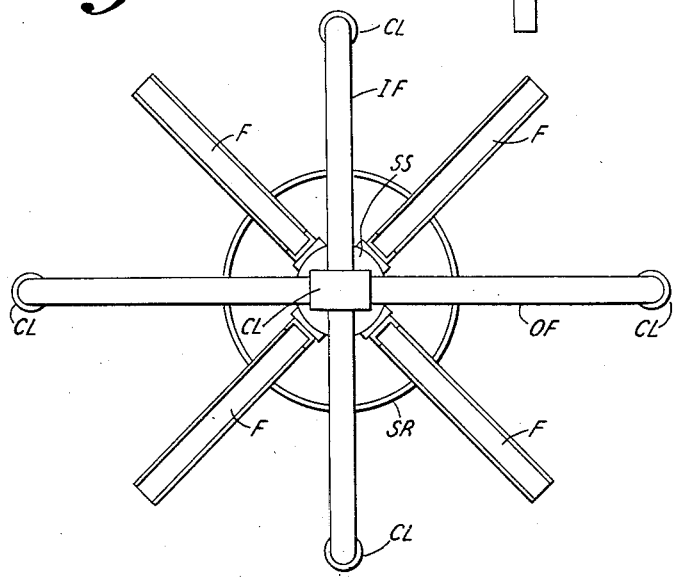
INVENTORS
OSCAR DOUGLAS KENNEDY
REGINALD HENRY MEAD
BY
ATTORNEY July 23, 1935.  O. D. KENNEDY ET AL  2,009,087
FRAME AERIAL FOR WIRELESS RECEPTION
Filed April 4, 1933    4 Sheets-Sheet 4
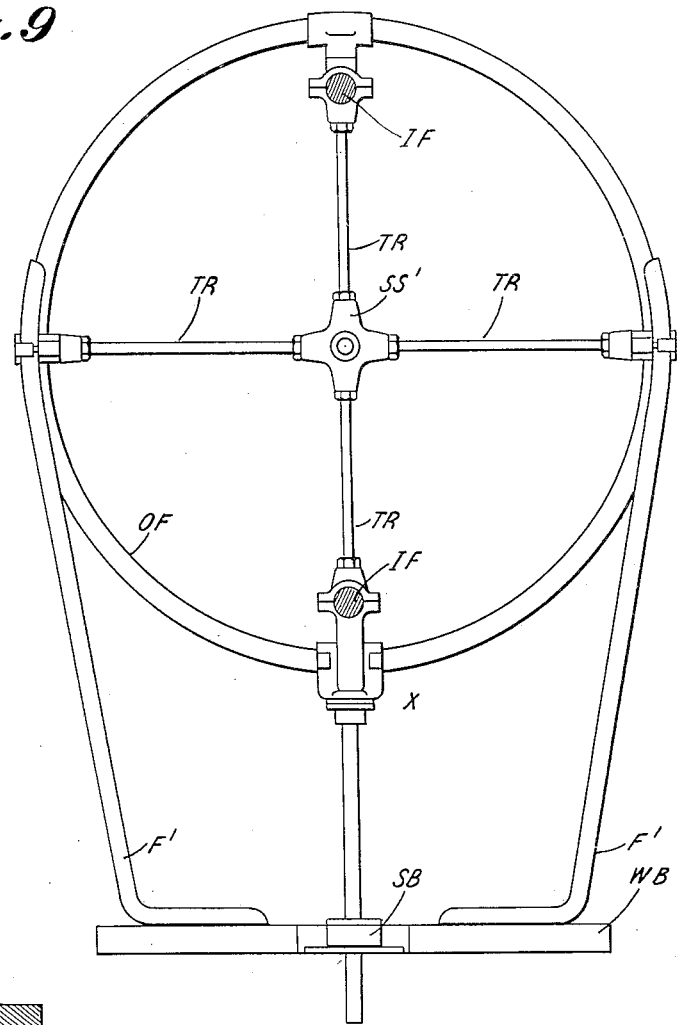
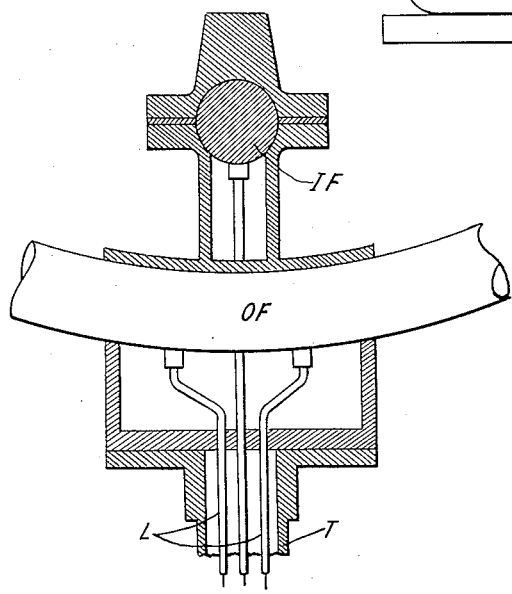
INVENTORS
OSCAR DOUGLAS KENNEDY
REGINALD HENRY MEAD
BY
ATTORNEY Patented July 23, 1935

2,009,087

UNITED STATES PATENT OFFICE 2,009,087

FRAME AERIAL FOR WIRELESS RECEPTION

Oscar Douglas Kennedy, Norbury, and Reginald Henry Mead, Wimbledon Park, England, assignors to Radio Corporation of America, a corporation of Delaware Application April 4, 1933, Serial No. 664,380
In Great Britain April 7, 1932

10 Claims. (Cl. 250—33)

This invention relates to frame aerials for wireless reception and has for its object to provide an improved loop or frame aerial suitable for use in direction finding wireless installations such as are commonly installed on shipboard.

The present invention is applicable both to directional receiving installations of the kind wherein the direction of a received wave is ascertained by means of a rotating loop aerial and of the kind wherein the said direction is ascertained by means of a so-called Bellini-Tosi system, i. e. a system wherein two mutually perpendicular fixed frames are employed.

Loop or frame aerials for use on shipboard must as a rule be very carefully protected against water and weather and a construction of loop aerial as at present in common use comprises a cylindrical coil or say 7 turns which is housed within and spaced by insulating spacers from a circular metal tube of about 3 feet in diameter, the tube acting as a shield and weather proof cover. In order that received wireless waves may act efficiently on the coils within the metal tube the continuity of the latter is broken by inserting therein one or more insulating pieces. It is found that when such constructions are employed upon certain classes of ships as, for example, trawlers and other small vessels, trouble is experienced due to the water leaking into the tube at the joints with the insulating pieces. Further, such constructions are relatively expensive.

According to the present invention a directional loop or frame aerial is constituted by a length of multiple wire water-proof cable structure connection to the wires, being made in a water tight manner e. g. by means of cable glands such as are ordinarily employed in electric power installations on shore, or by bringing the external connections out through the insulation of the cable, said cable and connections being made water tight by vulcanizing.

In one way of carrying out the present invention a multiple wire cable having a sufficient number of conductors to form the turns of a loop aerial (when said conductors are connected in series) is employed, and if required an outer layer of conductors is provided over the cable so as to act as a shield, the whole cable with the outer conductors (if any) being covered with an outer covering of water tight insulating material. The finished cable is bent into a circle or other required form of loop of the required diameter or size and the construction is such that when so bent the cable will form a self-supporting loop. If required additional diametrical struts may be provided to give extra rigidity and a vertical metal rod may also be fitted diametrically to serve, in manner well known per se, as a "sense" aerial cooperating with the frame aerial for direction finding. The whole aerial structure is carried from a supporting pillar or the like by means of an ordinary cable gland of construction well known per se and through which the necessary connections to the aerial are taken.

A particular form of construction in accordace with the invention is illustrated in the accompanying drawings, in which, Fig. 1 shows a cross section of a loop cable of this invention;

Fig. 2 shows a longitudinal section of the loop aerial;

Fig. 3 shows a detailed longitudinal section of the lower portion of the loop aerial;

Fig. 4 shows an elevational view of two mutually perpendicular fixed loops shown partly in section;

Fig. 6 is a plan view of Figs. 4 and 5;

Fig. 8 is another enlarged detailed section of Figs. 4 and 5, the section being taken at right angles to Fig. 7;

Fig. 9 shows an elevational view of a further modification of the mounting feet.

Figure 5:
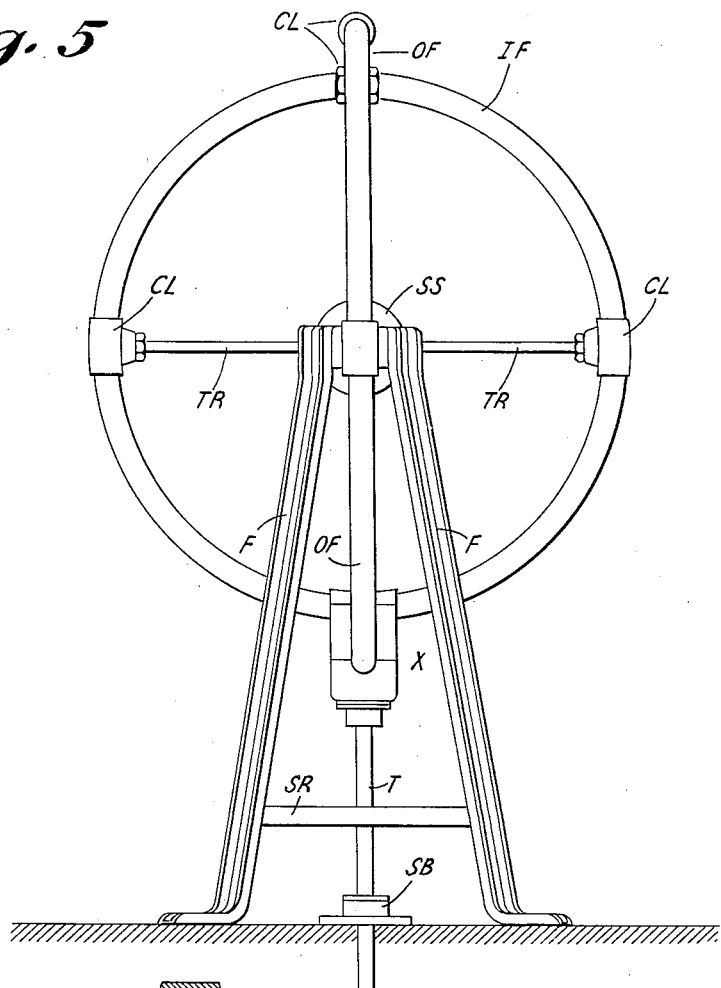
Fig. 5 shows an elevational view of two mutually perpendicular fixed loops, the view being taken at right angles to Fig. 4.

As mentioned above Figure 1 shows in cross section a cable which may be employed in carrying out the invention and which consists of seven cores 1 of high conductivity tinned copper insulated with pure and vulcanized india rubber 2 which is surrounded by lead alloy (e. g. lead-antimony) sheath 3 over which is over-laid a vulcanized and compounded braiding of rubber 4. A length of such cable is bent into a circle or other desired shape as shown in Figure 2, the cores 1 being connected in series to form a continuous loop to which connection is made by means of leads 7 which are brought out as shown, a gap 5 being left in the lead sheathing and the whole joint 6 being vulcanized solid. An ebonite sleeve 9 (as shown by Figure 3 of the drawings, which figure is an enlarged view of the joint 6 of Figure 2 of the drawings) may be provided to protect the joint. In Figure 3 for the sake of simplicity only two cores are shown; any number of cores may be employed as design considerations may dictate. The sheath 3 may be employed as a sense aerial, and to facilitate this a terminal 8 in connection with said sheath is provided.

Although a jointed cable has been referred to as employed in the last described embodiment it is obviously possible to employ a single unjointed wire wound round and round and to provide this winding with insulation and protection similar to that of the cable described and the phrase "multiple wire waterproof cable structure" as employed above is intended to include an insulated protected winding of this kind.

The accompanying drawings, Figs. 4 to 9 inclusive, also illustrate preferred mounting arrangements for so-called Bellini-Tosi aerial systems (two mutually perpendicular fixed frames) having aerials in accordance with this invention. The illustrated arrangements are suitable for use on shipboard.

Figure 7:
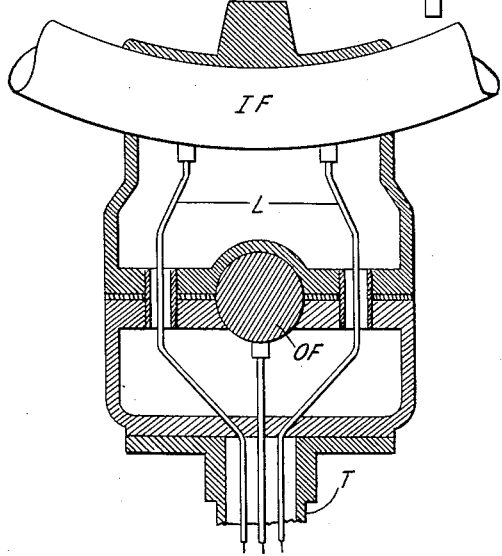
Fig. 7 is an enlarged detailed section of Figs. 4 and 5.

In the latter mentioned Figures 4 and 5 are mutually perpendicular elevations (Figure 4 is partly sectioned), Figure 6 a plan view and Figures 7 and 8 mutually perpendicular enlarged detail sections showing one form of construction. Figure 9 is an elevation showing a modified arrangement.

Referring to Figures 4 to 8 the installation comprises two mutually perpendicular circular fixed "cable frames" OF and IF as hereinbefore described. The frames are carried at the ends of metal tie rods TR by means of clamps CL clamped round the cables, the tie rods being carried at their inner ends from a spherical support member SS which is in turn carried by and bolted to channel section feet F bolted to the deck of the ship. At the bottom of the two frames are combined clamps and junction boxes generally designated X in Figures 4 and 5 and shown in enlarged detail in Figures 7 and 8, the down leads L being brought down as shown via a tube T which passes into a water-tight flange and stuffing box SB on the deck. SR is a stay ring of channel section bolted to the feet F. In Figures 7 and 8 the arrow heads indicate water-tight joints.

The construction shown in Figure 9 differs from that of Figures 4 to 8 principally in the arrangement of the feet F′ which are as shown, of curved channel section clamped to the frames and bolted down to a wooden base WB on the deck. The sphere SS of Figures 4 to 6 is replaced by a simple four spoked member SS′ to which the tie rods are fixed.

Having now particularly described and ascertained the nature of our said invention and in what manner the same is to be performed, we declare that what we claim is:—

1. A directional loop aerial comprising a plurality of conductor turns insulated from each other, a tubular metallic casing enclosing said conductor turns, said metallic casing formed to a substantially ring-like shape, an aperture provided in said casing where the ends abut, said aperture serving as a means for bringing out leads from said conductor turns to connect them to electrical translating apparatus and also breaking the continuity of the casing, a relatively heavy insulating coating entirely surrounding said casing and filling in the space where the ends of said casing abut.

2. A directional loop aerial comprising a plurality of conductor turns insulated from each other, a tubular metallic casing enclosing said conductor turns, said metallic casing formed to a substantially ring-like shape, an aperture provided in said casing where the ends abut, said aperture serving as a means for bringing out leads from said conductor turns to connect them to electrical translating apparatus and also breaking the continuity of the casing, a relatively heavy insulating coating of vulcanized rubber entirely surrounding said casing and filling in the space where the ends of said casing abut.

3. A directional loop aerial comprising a plurality of conductor turns insulated from each other, a tubular metallic casing enclosing said conductor turns, said metallic casing formed to a substantially ring-like shape, an aperture provided in said casing where the ends abut, said aperture serving as a means for bringing out leads from said conductor turns to connect them to electrical translating apparatus and also breaking the continuity of the casing, a relatively heavy ebonite sleeve interposed between said aperture, a relatively heavy insulating coating entirely surrounding said casing and said ebonite sleeve so as to fill in the entire aperture where the ends of said casing abut.

4. A directional loop aerial comprising a plurality of conductor turns insulated from each other, a tubular metallic casing enclosing said conductor turns, said metallic casing formed to a substantially ring-like shape, an aperture provided in said said casing where the ends abut, said aperture serving as a means for bringing out leads from said conductor turns to connect them to electrical translating apparatus and also breaking the continuity of the casing, a relatively heavy ebonite sleeve interposed between said aperture, a relatively heavy insulating coating of vulcanized rubber entirely surrounding said casing and said ebonite sleeve so as to fill in the entire aperture where the ends of said casing abut.

5. A directional loop aerial comprising a plurality of insulated conductor turns, a tubular metallic casing enclosing said conductor turns, said metallic casing formed to a substantially ring-like shape, an aperture provided in said casing where the ends abut, said aperture serving as a means for bringing out leads from said conductor turns to, electrical translating apparatus and breaking the continuity of said casing, an insulating compound entirely filling the interstices between said conductor turns and surrounding said casing with a relatively heavy coat so as to fill in the entire aperture where the ends of said casing abut.

6. A directional loop aerial comprising a plurality of conductor turns insulated from each other, two tubular metallic casings enclosing said conductor turns and formed to a substantially ring-like shape, an aperture in each of said casings where their ends abut to break the electrical continuity of the circuit, one of said casings being of a slightly larger diameter than the other and located at right angles to the other casing, both of said casings joined at the center by means of a spherical support member and a plurality of rods, a plurality of upwardly extending supporting feet for supporting and securing said casings and said spherical member.

7. A directional loop aerial comprising a plurality of conductor turns insulated from each other, two tubular metallic casings enclosing said conductor turns and formed to a substantially ring-like shape, an aperture in each of said casings where their ends abut to break the electrical continuity of the circuit, one of said casings being of a slightly larger diameter than the other and located at right angles to the other casing, both of said casings joined at the center by means of a spherical support member and a plurality of rods, four upwardly extending channel-shaped supporting feet for supporting and securing said casings and said spherical member.

8. A directional loop aerial comprising a plurality of conductor turns insulated from each other, two tubular metallic casings enclosing said conductor turns and formed to a substantially ring-like shape, an aperture in each of said casings where their ends abut to break the electrical continuity of the circuit, one of said casings being of a slightly larger diameter than the other and located at right angles to the other casing, both of said casings joined at the center by means of a spherical support member and a plurality of rods, a plurality of upwardly extending supporting feet for supporting and securing said casings and said spherical member, a watertight junction box secured to the lower portion of said casings for connecting said conductor turns to external translating apparatus.

9. A directional loop aerial comprising a plurality of conductor turns insulated from each other, two tubular metallic casings enclosing said conductor turns and formed to a substantially ring-like shape, an aperture in each of said casings where their ends abut to break the electrical continuity of the circuit, one of said casings being of a slightly larger diameter than the other and located at right angles to the other casing, both of said casings joined at the center by means of a central hub member and a plurality of rods, a plurality of upwardly extending supporting feet secured at the outside of said larger loop, for supporting and securing said casings and said spherical member.

10. A directional loop aerial comprising a plurality of conductor turns insulated from each other, two tubular metallic casings enclosing said conductor turns and formed to a substantially ring-like shape, an aperture in each of said casings where their ends abut to break the electrical continuity of the circuit, one of said casings being of a slightly larger diameter than the other and located at right angles to the other casing, both of said casings joined at the center by means of four spoked members and a plurality of rods, a plurality of upwardly extending supporting feet secured at the outside of said larger loop, for supporting and securing said casings and said spherical member.

OSCAR DOUGLAS KENNEDY.
REGINALD HENRY MEAD.